(12) United States Patent
Bergman et al.

(10) Patent No.: US 8,326,148 B2
(45) Date of Patent: Dec. 4, 2012

(54) OPTICAL NETWORK

(75) Inventors: Keren Bergman, Princeton, NJ (US);
Assaf Shacham, Magshimim (IL)

(73) Assignee: The Trustees of Columbia University in the City of New York, New York, NY (US)

( * ) Notice: Subject to any disclaimer, the term of this patent is extended or adjusted under 35 U.S.C. 154(b) by 1007 days.

(21) Appl. No.: 12/113,554

(22) Filed: May 1, 2008

(65) Prior Publication Data
US 2009/0169205 A1    Jul. 2, 2009

Related U.S. Application Data

(63) Continuation of application No. PCT/US2006/060577, filed on Nov. 6, 2006.

(60) Provisional application No. 60/734,890, filed on Nov. 9, 2005, provisional application No. 60/733,842, filed on Nov. 4, 2005.

(51) Int. Cl.
*H04J 14/00* (2006.01)
(52) U.S. Cl. ............... 398/51; 398/45; 398/48; 398/54; 398/57; 398/47; 398/24; 398/16; 398/17; 398/18; 370/351; 370/352; 370/392; 370/389; 370/466; 370/401; 370/235; 370/395.4

(58) Field of Classification Search .................... 398/45, 398/46, 47, 48, 49, 50, 51, 52, 53, 54, 55, 398/56, 83, 79, 59, 57, 58; 385/24, 16, 17, 385/18, 37; 370/388, 389, 392, 395, 394, 370/390, 466, 395.4, 235, 401, 230, 432, 370/360, 352, 351, 465, 503, 217, 218, 222, 370/223, 225, 232, 474, 476, 252, 254, 535
See application file for complete search history.

(56) References Cited

U.S. PATENT DOCUMENTS

| | | |
|---|---|---|
| 4,775,216 A | 10/1988 | Layton |
| 5,032,010 A | 7/1991 | Su |
| 5,191,626 A | 3/1993 | Stern |
| 5,287,316 A | 2/1994 | Urushidani et al. |

(Continued)

FOREIGN PATENT DOCUMENTS
EP    1 351 458    3/2003

OTHER PUBLICATIONS

U.S. Appl. No. 12/516,131, Apr. 10, 2012 Non-Final Office Action.

(Continued)

*Primary Examiner* — Hanh Phan
(74) *Attorney, Agent, or Firm* — Baker Botts L.L.P.

(57) ABSTRACT

An optical network is disclosed comprising one or more photonic switching nodes is disclosed. Each of the switching nodes comprises a plurality of input ports; at least one output port; and a switch configured to route messages between the plurality of input ports and the at least one output port and provide bufferless resolution of contention between messages for a common output port.

34 Claims, 11 Drawing Sheets

U.S. PATENT DOCUMENTS

| | | | |
|---|---|---|---|
| 5,463,486 | A | 10/1995 | Stevens |
| 5,912,753 | A | 6/1999 | Cotter et al. |
| 6,125,112 | A * | 9/2000 | Koning et al. ............... 370/388 |
| 6,268,952 | B1 | 7/2001 | Godil et al. |
| 6,385,364 | B1 | 5/2002 | Abushagur |
| 6,609,840 | B2 | 8/2003 | Chow et al. |
| 6,740,864 | B1 | 5/2004 | Dries |
| 6,778,536 | B1 | 8/2004 | Ofek et al. |
| 6,810,211 | B1 | 10/2004 | Castanon |
| 6,845,184 | B1 | 1/2005 | Yoshimura et al. |
| 6,904,239 | B2 | 6/2005 | Chow et al. |
| 7,433,931 | B2 | 10/2008 | Richoux |
| 7,522,836 | B2 | 4/2009 | Islam |
| 7,650,081 | B2 | 1/2010 | Jennen et al. |
| 7,840,323 | B2 | 11/2010 | Bour et al. |
| 2002/0018263 | A1 | 2/2002 | Ge et al. |
| 2002/0031124 | A1* | 3/2002 | Li ............................. 370/390 |
| 2002/0093704 | A1* | 7/2002 | Dotaro et al. ................. 359/117 |
| 2002/0131120 | A1* | 9/2002 | Araki et al. ................... 359/139 |
| 2003/0128980 | A1 | 7/2003 | Abeles |
| 2003/0133641 | A1 | 7/2003 | Yoo |
| 2004/0213570 | A1 | 10/2004 | Wai et al. |
| 2004/0220886 | A1 | 11/2004 | Kumaran et al. |
| 2004/0258348 | A1 | 12/2004 | Deliwala |
| 2005/0063701 | A1* | 3/2005 | Ovadia et al. ................. 398/45 |
| 2005/0078666 | A1 | 4/2005 | Beshai |
| 2005/0078902 | A1 | 4/2005 | Beausoleil et al. |
| 2005/0111777 | A1 | 5/2005 | Stenger et al. |
| 2006/0222361 | A1* | 10/2006 | Aoki ............................. 398/51 |
| 2006/0285567 | A1 | 12/2006 | Otoma |
| 2008/0285971 | A1 | 11/2008 | Liboiron-Ladouceur et al. |
| 2011/0052192 | A1 | 3/2011 | Small et al. |
| 2011/0103799 | A1 | 5/2011 | Shacham et al. |

OTHER PUBLICATIONS

U.S. Appl. No. 12/054,111, Feb. 23, 2012 Final Office Action.

U.S. Appl. No. 12/054,111, Dec. 16, 2011 Response to Non-Final Office Action.

U.S. Appl. No. 12/054,111, Aug. 19, 2011 Non-Final Office Action.

U.S. Appl. No. 12/054,111, May 20, 2011 Response to Non-Final Office Action.

U.S. Appl. No. 12/054,111, Dec. 21, 2010 Non-Final Office Action.

Bauknecht et al., "12Gbit/s laser diode and optical modulator drivers with InP/InGaAs double HBTs", *Electronic Letters*, Nov. 7, 1996; 32(23): 2156-2157.

Chamberlain et al., Gemini: An Optical Interconnection Network for Parallel Processing, *IEEE Transactions on Parallel and Distributed Systems*, 13(10): 1038-1055, Oct. 2002.

Chen et al., On-Chip Copper-Based vs. Optical Interconnects: Delay Uncertainty, Latency, Power, and Bandwidth Density Comparative Predictions, Jun. 2006 [online], retrieved from the Internet: <http://www.ece.rochester.edu/users/friedman/papers/IIT_06.pdf>.

Dorgeuille et al., "Fast optical amplifier gate array for WDM routing and switching applications", *OFC '98 Technical Digest*, Tuesday Afternoon, 1998: 42-44.

Guillemot et al., "Transparent optical packet switching: The European ACTS KEOPS project approach",*Journal of Lightwave Technology*, Dec. 1998; 16(12): 2117-2134.

Heirman et al., Speeding up multiprocessor machines with reconfigurable optical interconnects. In Proc. SPIE vol. 6124, optoelectronic Integrated Circuits X, Jan. 2006 [online], retrieved from the Internet: <http://eschar.elis.ugent.be/publ/Edocs/DOC/P106_036.pdf>.

Heirman et al., Reconfigurable Optical Networks for On-Chip Multiprocessors, Proceedings of the Special Workshop on Future Interconnects and Networks on a Chip, Mar. 10, 2006 (Oct. 5, 2006) [online], retrieved from the Internet: <https://archive.ugent.be/retrieve/5767/P106_027.pdf>.

Krishnamoorthy et al., "Triggered receivers for optoelectronic VLSI",*Electronic Letters*, Feb. 3, 2000; 36(3): 249-250.

Mokhtari et al., "Bit-rate transparent electronic data regeneration in repeaters for high speed lightwave communication systems", *Circuits and Systems, 1999. Proceedings of the 1999 IEEE International Symposium on Circuits and Systems*, 1999: 508-511.

Sacham et al., "A Fully Implemented 12X12 Data vortex Optical Packet Swwitching Interconnection Network". *Journal of Lightwave Technology*, 23(10): 3066-3075 (2005).

Sahri et al., "A highly integrated 32-SOA gates optoelectronic module suitable for IP multi-terabit optical packet routers", *Optical Fiber Communication Conference and Exhibit*, 2001; vol. 4: PD32-1-PD32-3.

Schneibel et al., "High current InP double hetero bipolar transistor driver circuit for laser diodes", *11th International Conference on Indium Phosphide and Related Materials*, May 1999: 455-457.

Venditti et al., "Design and test of an optoelectronic-VLSI chip with 540-element receiver-transmitter arrays using differential optical signaling", *IEEE Journal of Selected Topics In Quantum Electronics*, Mar./Apr. 2003; 9(2): 361-379.

U.S. Appl. No. 12/516,131, Jul. 2, 2012 Response to Non-Final Office Action.

U.S. Appl. No. 12/054,111, Jun. 22, 2012 Amendment and Request for Continued Examination (RCE).

U.S. Appl. No. 12/438,661, Jul. 26, 2012 Non-Final Office Action.

U.S. Appl. No. 12/516,131, Aug. 24, 2012, Notice of Allowance.

* cited by examiner

OPTICAL NETWORK

CROSS-REFERENCE TO RELATED APPLICATIONS

This application is a continuation of PCT International Application No. PCT/US06/060577 filed Nov. 6, 2006 which claims the benefit of U.S. Provisional Patent Application Ser. Nos. 60/733,842, filed on Nov. 4, 2005, entitled "A Scalable, Self-Routed, Terabit Capacity, Photonic Interconnection Network" and 60/734,890, filed on Nov. 9, 2005, entitled "Utilizing Path Diversity in Optical Packet Switched Interconnection Networks," which are hereby incorporated by reference in their entirety herein.

BACKGROUND OF THE INVENTION

1. Technical Field

The disclosed subject matter relates to an optical network having one or more photonic switching nodes.

2. Background Information

Contemporary high performance computing (HPC) systems typically use the distributed shared memory (DSM) paradigm, wherein the entire memory is logically shared among all the processors but may be physically implemented using memory modules distributed across many computing nodes. This approach simplifies programming, provides portability of software, and exhibits improved scalability over traditional shared memory systems. Large scale DSM systems, however, suffer from a fundamental communication problem that significantly affects scalability: increased latency of remote memory accesses. The remote access latency problem is becoming critically more pronounced with faster processor speeds as each memory access consumes a correspondingly larger number of clock cycles.

Interconnection networks with low latency and high bandwidth have therefore become an important component in the design of HPC systems. Cutting-edge electronic transmission technologies, such as Hyper-transport and PCI-Express, as well as high performance cross-point switching fabrics are currently used to construct such networks. However, a performance gap is beginning to emerge between the processors, whose performance scales quickly according to Moore's law, and the interconnecting medium which fails to advance at a commensurate rate due to fundamental physical limitations. Dynamic power consumption, wiring density, and signal distortion are fundamental impediments to the scaling of electronic interconnection networks. Additionally, transmission of signals at high data rates (e.g., in excess of 1 Gb/s) over long electronic transmission lines (e.g., longer than 1 m) results in signal distortion which makes decoding these signals difficult or requires great amounts of power, large chip area, and high cost to ensure correct detection. Sophisticated signal processing techniques, such as pre-emphasis and equalization, can mitigate these effects to some extent, but they add to the overall latency and are expensive both in power and area. An alternative approach is to use relatively short transmission lines and an indirect topology such as a mesh or a torus, based on low-radix routers, but this approach leads to further increases in the overall latency as each packet has to traverse a larger number of hops.

Photonic interconnection networks are a potentially transformative technology with the capability to overcome these limitations and provide commensurate performance scaling. The enormous bandwidth of optical fibers, approximately 32 THz, facilitates the transmission of multiple data streams on a single fiber at very high data-rates using wavelength division multiplexing (WDM). The low loss in fibers, nearly zero for the distances relevant to interconnection networks, alleviates the need for regeneration and effectively removes the signal transmission limitation. The photonic medium also allows for bidirectional transmission and switching of high-rate data using optical switching elements completely transparent to the modulated data, a property known as bit-rate transparency. Semiconductor optical amplifiers (SOAs) are used in several experimental optical packet switching systems as on-off photonic gates, providing a substantial gain over a wide switching band, and sub-ns switching times.

Photonic technology presents, however, some fundamental design challenges specifically in its lack of efficient buffering and processing capabilities. Although some promising technologies such as photonic crystals are being investigated and may prove useful in constructing photonic memories and logic gates, they have failed to reach commercialization thus far. Optical buffers based on recirculating fiber delay lines have been demonstrated as have interferometeric optical logic gates but their dimensions and "bulkiness" prohibit them from becoming cost-effective solutions.

An impediment to the construction of photonic interconnection networks lies in the high cost and large footprints associated with using discrete optical elements such as lasers, modulators, switches and passive optics. Photonic integration, the fabrication of circuits implementing multiple photonic functions in a single package, is promising to eliminate these final barriers. Since the elements comprising the prohibitive cost of optical networks mainly lie in the assembly and packaging of very large systems, and a significant share of the power consumption rises from coupling losses between individually packaged devices, integration of large parts of the network on a single photonic integrated circuit (PIC) alleviates these factors. Monolithic Indium-Phosphide PICs containing 50 photonic functions have been reported in scientific literature and are now commercially available. Additionally, silicon-based optical and electro-optical components such as modulators, photodetectors, and waveguides, all compatible with standard (CMOS) processing techniques have recently become available, promising an unprecedented potential for low cost electronic-optical interfacing.

When photonic integration is harnessed to construct interconnection networks, however, buffering becomes very difficult. The optical packet typically occupies a fixed length of a waveguiding medium which is the product of the speed of light in the medium and the duration of the packet. The size of optical packets known in the art occupy a certain amount of space, such that it is difficult, if not impossible, to fit on an integrated circuit. For example, a typical 100-ns packet will occupy 20 meters of silica fiber or 6 meters of a semiconductor waveguide. Consequently, buffering optical packets within a PIC is not currently practical.

Accordingly, there is a need in the art to provide a scalable interconnection network based on photonic integration that offers a bufferless means of contention resolution.

SUMMARY OF THE INVENTION

An optical network is disclosed comprising one or more photonic switching nodes, each of which, comprises a plurality of input ports; at least one output port; and a switch configured to route messages between the plurality of input ports and the at least one output port and provide bufferless resolution of contention between messages for a common output port.

In some embodiments, the switch selects a first message in the case where two or more messages contend for a common output port. In some embodiments, the switch drops a second message in the case where two or more messages contend for a common output port. In some embodiments, the switch selects said first message randomly, according to an alternating scheme, or according to priority information encoded in said messages.

In some embodiments, the optical network may further include a source terminal and a destination terminal, wherein the photonic switching nodes transmit a first message on a path from said source terminal to said destination terminal. The destination terminal may transmit an acknowledgment signal to the source terminal of a message upon receipt of said message at its requested output port. In some embodiments, the photonic switching nodes transmit said acknowledgement signal on said path from said destination terminal to said source terminal. The optical network may retransmit the message in the case where an acknowledgment signal is not received. In some embodiments, the optical network retransmits the message in the case where an acknowledgment signal is not received prior to the end of a slot.

In some embodiments, the switch comprises a programmable logic device. The photonic switching nodes may be interconnected in a Banyan topology. The photonic switching nodes may be interconnected in an Omega topology.

In some embodiments, the message comprises routing information at a first wavelength and data at a second wavelength. The switch may comprise wavelength filters associated with said first wavelength and said second wavelength.

In some embodiments, the optical network may comprise one or more scattering nodes. The one or more photonic switching nodes and one or more scattering nodes may transmit the first message on a path from the source terminal to the destination terminal. The destination terminal may transmit an acknowledgment signal to the source terminal of a message upon receipt of the message at its requested output port. The one or more photonic switching nodes and one or more scattering nodes may pass said acknowledgement signal on said path from said destination terminal to said source terminal.

The optical network may further include a distribution network comprising one or more distribution stages for routing messages comprising a distribution address. The source terminal changes the distribution address of a message prior to retransmission. In some embodiments, transmission in the optical network is synchronous. In some embodiments, the optical network is slotted.

A method is provided for transmitting messages through an optical network. A network comprising one or more photonic switching nodes for transmitting messages therethrough is provided. One or more messages is received at one or more input ports of a photonic switching node, each message comprising routing information relating to a requested output port. In the case of two or more messages contending for a common output port, bufferless contention resolution of contention between messages for a common output port is provided. The messages are transmitted through the network.

BRIEF DESCRIPTION OF THE DRAWINGS

Further features and advantages of the disclosed subject matter will become apparent from the following detailed description taken in conjunction with the accompanying figures showing illustrative embodiments of the disclosed subject matter, in which.

Throughout the figures, the same reference numerals and characters are used to denote like features, elements, components or portions of the illustrated embodiments, unless otherwise stated.

DETAILED DESCRIPTION OF EXEMPLARY EMBODIMENTS

In an exemplary embodiment of a scalable photonic integrated network, port-to-port optical packets (messages) can be self-routed through an optical multistage interconnection network. The network may be constructed from 2×2 photonic switching nodes, while the payload is maintained in the optical domain across the network. The messages may be constructed in a manner according to wavelength division multiplexing to achieve high bandwidth and simplify the node design.

Figure 1:
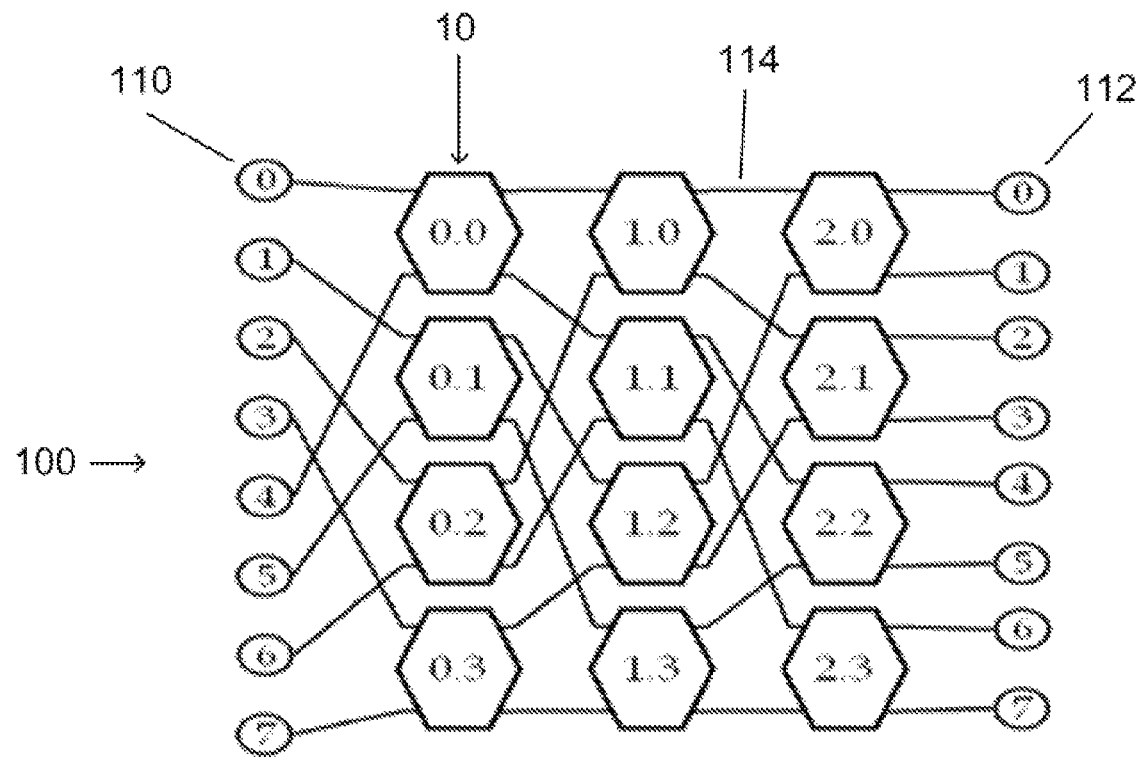
FIG. 1 is a diagram representing a network of switching nodes in accordance with an exemplary embodiment of the disclosed subject matter.

FIG. 1 illustrates a scalable photonic integrated network 100. In an exemplary embodiment, the network is a binary butterfly-class multistage interconnection network, comprised of 2×2 photonic wideband switching nodes 10. FIG. 1 shows a scalable photonic integrated network 100 implemented in an Omega topology, but the specific topology can encompass other implementations, such as Banyan, Butterfly, 4-cube, and Baseline.

The system shown in FIG. 1 may be synchronous and slotted. The messages are constructed in the source terminals 110 and are transmitted on optical fibers or optical waveguides 114 into the network 100.

For a slot, messages start propagating substantially simultaneously in the network 100. According to an exemplary embodiment, messages may be self-routed. Such messages include information regarding an intended destination terminal. The intended destination terminal may or may not be the message's ultimate destination. At a switching node 10, when a leading edge of a message is received, a routing decision is made, and the message continues to propagate to its requested output port 14. Output port contention may occur, for example, when two messages arrive at a node and request the same output port. In such case, one of the contending messages is transmitted, and one (or more) contending messages is dropped. The choice of which message to drop may be, for example, random, alternating or priority-based. For example, in a priority-based scheme, priority information may be encoded on a specific wavelength in the message. The switching node may decode such information and use it to make the routing decision so that the message with the higher priority is transmitted and the message with the lower priority is dropped. In an exemplary embodiment, the propagation delay through every stage may be substantially identical, such that the leading edges of the transmitted messages reach all the nodes 10 of each stage at the same time.

Figure 2:
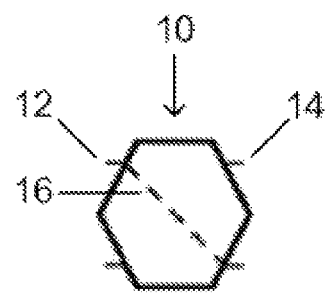
FIG. 2 is a diagram representing a switching node in accordance with an exemplary embodiment of the disclosed subject matter.

FIG. 2 illustrates a 2×2 photonic wideband switching node 10 with input ports 12 and output ports 14. A switch path 16 is established between an input port 12 and an output port 14.

Figures 3A, 3B, 3C:
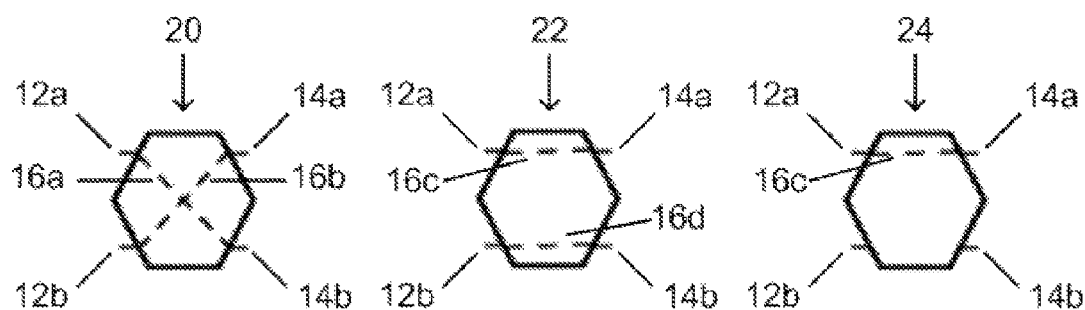
FIGS. 3A to 3F are diagrams representing switching states of a switching node in accordance with an exemplary embodiment of the disclosed subject matter.
Figures 3D, 3E, 3F:
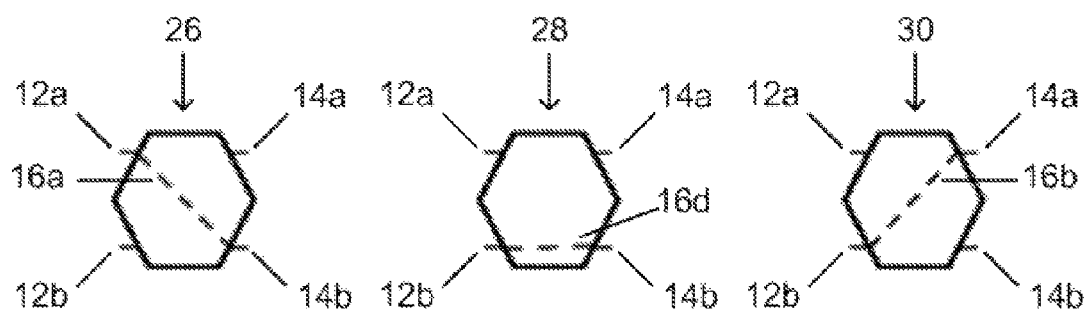

FIGS. 3A to 3F illustrate the 6 states of a switching node 10. FIG. 3A illustrates an interchange state 20 in which an upper-to-lower switch path 16a is established between the upper input port 12a and the lower output port 14b and a lower-to-upper switch path 16b is established between the lower input port 12b and the upper output port 14a. FIG. 3B illustrates a straight state 22 in which an upper straight switch path 16c is established between the upper input port 12a and the upper output port 14a and a lower straight switch path 16d is established between the lower input port 12b and the lower output port 14b. FIG. 3C illustrates an upper straight state 24 in which only an upper straight switch path 16c is established between the upper input port 12a and the upper output port 14a. FIG. 3D illustrates an upper exchange state 26 in which only an upper-to-lower switch path 16a is established between the upper input port 12a and the lower output port 14b. FIG. 3E illustrates a lower straight state 28 in which only a lower straight switch path 16d is established between the lower input port 12b and the lower output port 14b. FIG. 3F illustrates a lower exchange state 30 in which only a lower-to-upper switch path 16b is established between the lower input port 12b and the upper output port 14a. As will be understood by one of ordinary skill in the art, additional and/or different states may be provided for nodes having a different number of input or output ports. Further, the terms "upper" and "lower" as used in FIGS. 3A-3F to describe input and output ports are used for convenience of description only, and will generally be understood to refer to a "first" and a "second" port.

Figure 4:
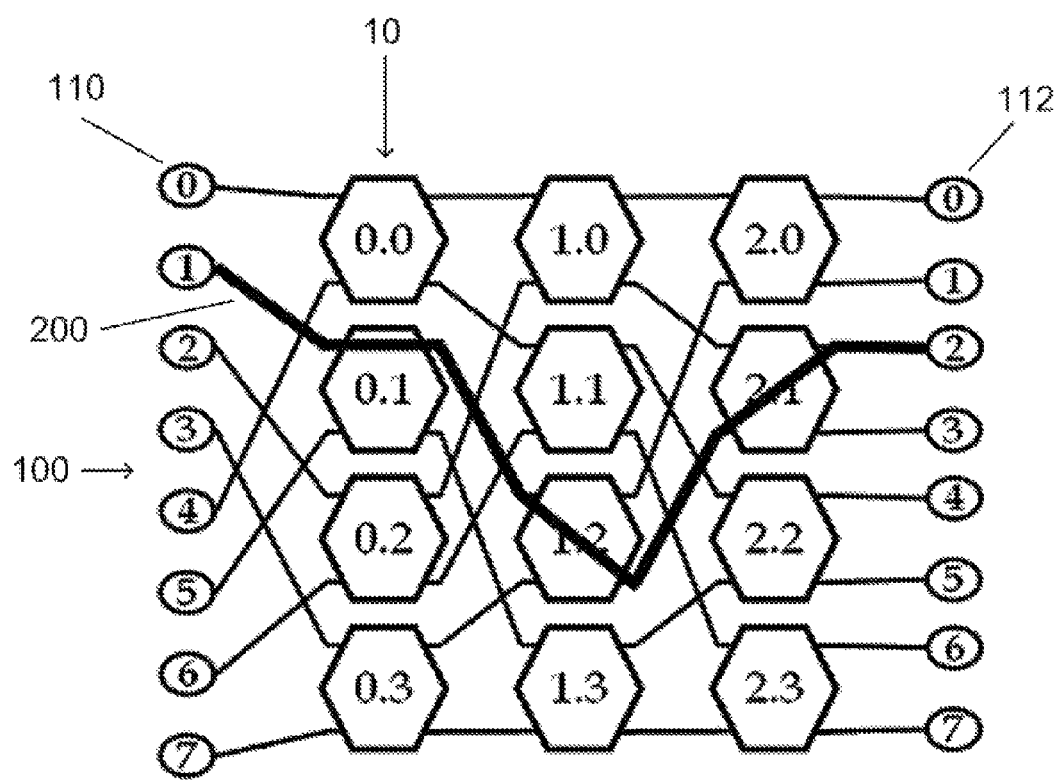
FIG. 4 is a diagram representing a message transmitted through the network in accordance with an exemplary embodiment of the disclosed subject matter.

FIG. 4 illustrates that the switching states (e.g., states 20-30 illustrated in FIGS. 3A-3F) of the switching nodes 10, as determined by leading edges, remain constant throughout the duration of the message, e.g., throughout a slot, so the entire message follows each switch path 16 acquired by the leading edge, effectively creating a transparent lightpath 200 between the source terminal 110 and destination terminal 112. When the messages reach their destinations, an acknowledgement optical pulse ("ack pulse") is generated at the destination terminal and sent on the same transparent lightpath 200 in the opposite direction. Owing to the bidirectionality of the switching nodes 10, the acknowledgement pulses are transmitted along the lightpath 200 to the appropriate source terminals 110.

When the slot time is over, all source terminals 110 and destination terminals 112 may cease transmission simultaneously, the switching nodes 10 reset their switching states 20-30, and the system is ready for a new slot. The slot duration may be set so that the ack pulses are received at the source terminal 110 before the slot ends, allowing every source terminal 110 to determine whether its message was successfully transmitted and make a timely decision regarding its retransmission in the case that the message was dropped. This physical-layer acknowledgement mechanism allows the source terminals 110 to regard the dropped messages as blocked messages and avoid the penalty associated with packet recovery at higher layers.

Figure 5:
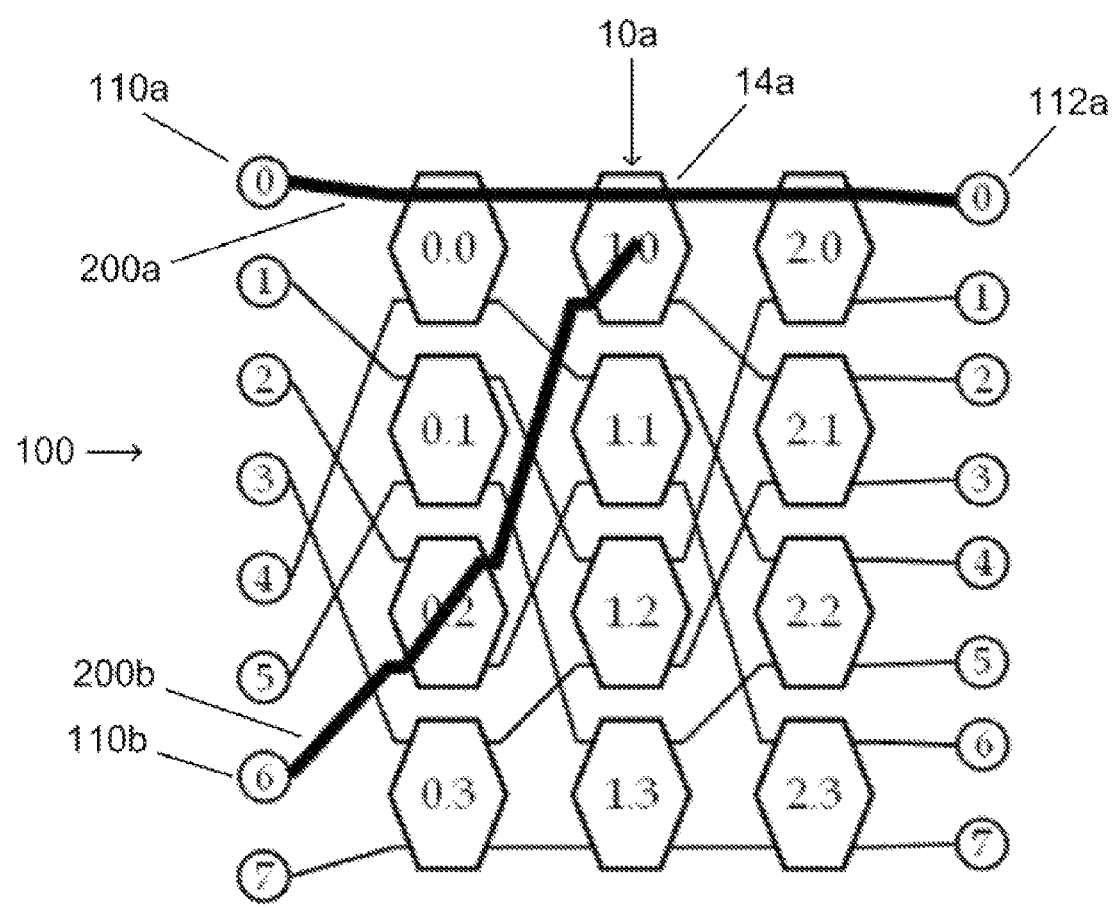
FIG. 5 is a diagram representing a message dropped by a switch in the network in accordance with an exemplary embodiment of the disclosed subject matter.

FIG. 5 illustrates a condition in which two messages contend for the same output port 14a of node 10a. The message originating from source terminal (0) 110a, traveling on lightpath 200a, is transmitted to destination terminal 112a. The message originating from source terminal (6) 110b, traveling on lightpath 200b, is dropped. Destination terminal (0) 112a transmits an acknowledgement signal on lightpath 200a to source terminal (0) 110a. Source terminal (6) 110b receives no acknowledgement signal and prepares to retransmit its message.

Figure 6:
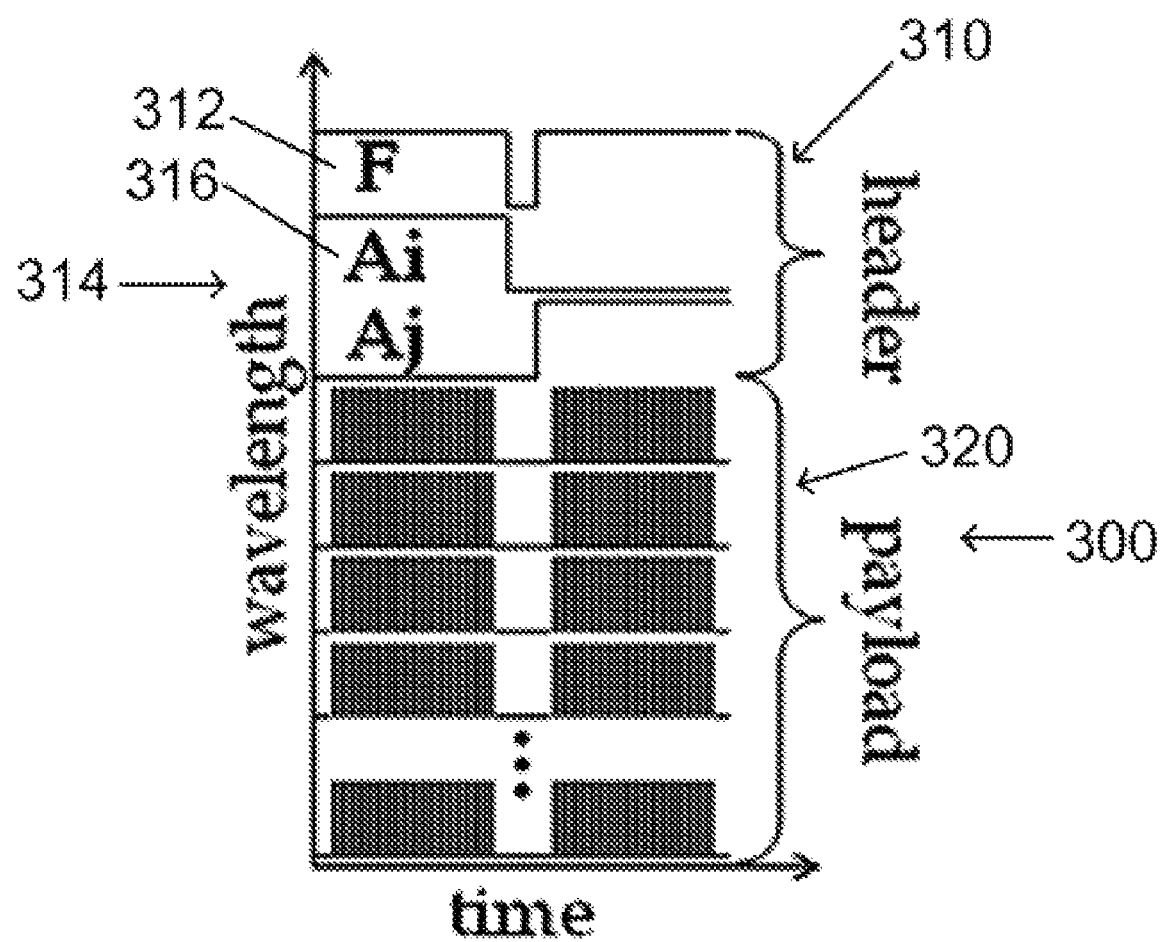
FIG. 6 is a diagram representing the wavelength distribution of a message in accordance with an exemplary embodiment of the disclosed subject matter.

According to an exemplary embodiment, the wavelength domain is used to facilitate a routing mechanism in the switching nodes 10 that can instantaneously determine and execute the routing decision upon receiving the messages' leading edges, and maintain a constant switching state 20-30 throughout duration of the messages. As shown in FIG. 6, the messages 300 are constructed in a wavelength-parallel manner, i.e., the routing header bits 310 and the payload 320 may be encoded on separate wavelengths and are received substantially concurrently by the switching nodes 10. The header bits 310 comprise a frame bit 312, denoting the existence of the message, and a destination address tag 314, which is comprised of address bits 316. Each of the header bits, encoded on a dedicated wavelength, remains constant throughout the message. According to an exemplary embodiment, a single address bit 316 is processed at every stage, so the number of wavelengths required for address encoding is $\log_2$ of the number of output ports. Segmenting the payload 320 and encoding on multiple wavelengths utilize the large bandwidth offered by wavelength division multiplexing.

Butterfly networks may be used in the scalable photonic integrated network 100 because their binary nature facilitates the usage of destination tag routing and simple decision rules that are desirable for ultra-low latency optical switching. When messages originating from different input ports may contend for the same output ports, the process of implicit arbitration through self-routing also eliminates the need for a central arbitration mechanism thus allowing the system to scale to large port-counts. However, these blocking networks will have a lower throughput than non-blocking networks, in which a disjoint path exists between each pair of input/output terminals. Contention avoidance techniques and topological modifications as well as input speedup can be utilized to increase the message acceptance rate.

According to an exemplary embodiment, a large number of switching nodes 10 may be implemented on a single PIC. Commercially available optoelectronic elements such as semiconductor optical amplifier (SOA) gates and photodetectors may be used. For example, SOAs offer the uniform gain curve, sub-ns switching time and low latency required from electronically controlled optical switching gates in a switching node 10.

Figure 7:
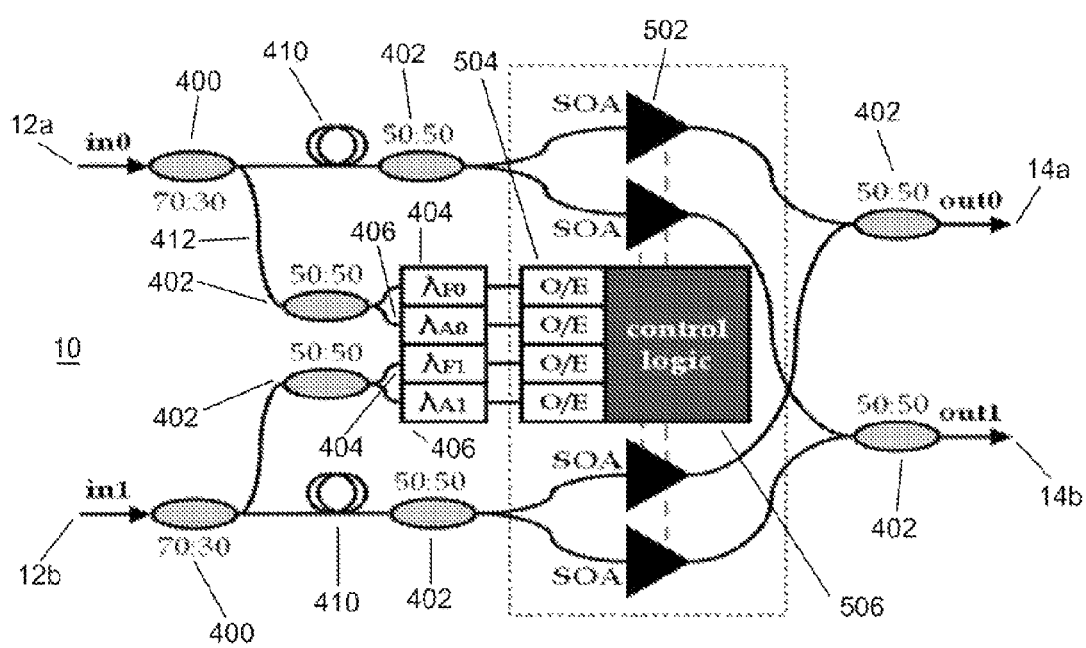
FIG. 7 is a diagram representing a node in the network in accordance with an exemplary embodiment of the disclosed subject matter.

FIG. 7 illustrates one exemplary embodiment of the switching node. Switching node 10 includes a switch which routes messages received at input ports 12a and/or 12b to output ports 14a and 14b. Further, the switch selects a message for transmission to its requested output port as will be described in greater detail below. The switch may be comprised of semiconductor optical amplifier gates (SOAs) 502, optical couplers 400 and 402, wavelength filters 404 and 406, p-i-n receivers 504, optical fibers 410, and a programmable logic device 506. These elements may be connected together using optical fiber or waveguides 410, depending on the implementation. Any of these elements may be substituted with other elements or rearranged as is known to one of skill in the art. When messages enter the switching node 10 at input ports 12a and/or 12b, the relevant header bits 310 (frame bit 312, denoting message existence, and a relevant address bit 316) are optically extracted from both messages using frame wavelength filters 404 and address wavelength filters 406, detected, and forwarded to an electronic control circuit 506. The control circuit 506, e.g., a Xilinx complex programmable logic device (CPLD) in the exemplary embodiment, makes the routing decision and activates the appropriate SOAs (or SOA) 502 to create the required input-output path. The messages, delayed on optical fibers 410, reach the SOAs 502 exactly when they are activated and are routed appropriately. The routing decision as to whether to transmit contending messages is determined by the control circuit 506.

Figure 8:
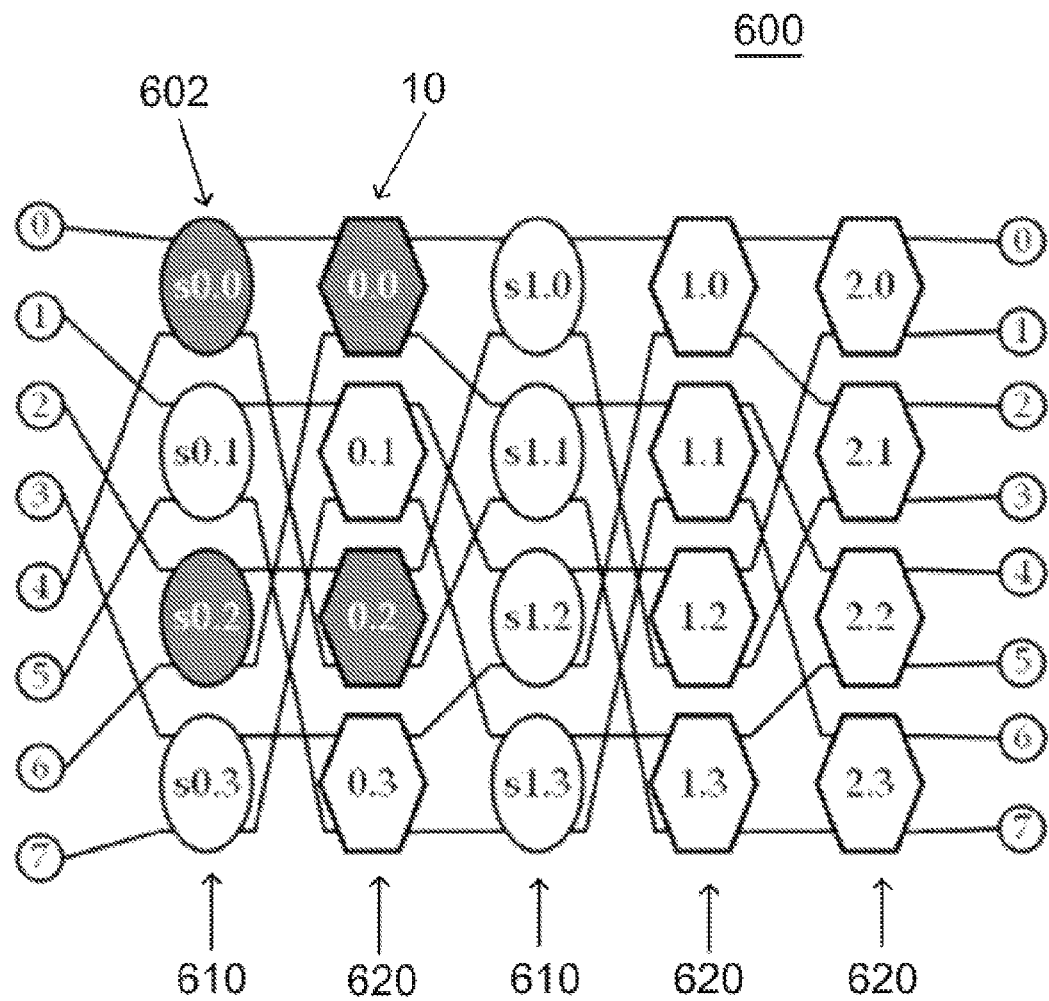
FIG. 8 is a diagram representing a switching network in accordance with another embodiment of the disclosed subject matter.
Figure 9:
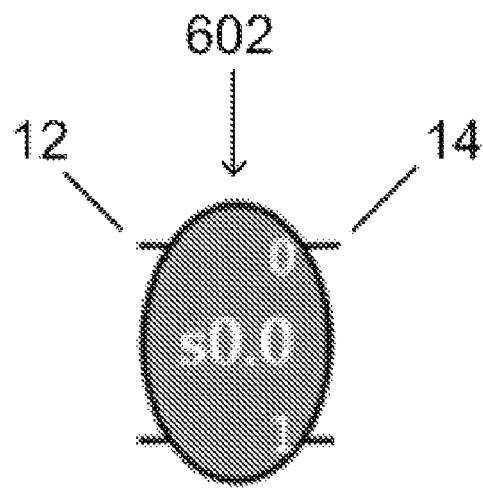
FIGS. 9-10 are diagrams representing nodes in a network illustrated in FIG. 8 in accordance with an exemplary embodiment of the disclosed subject matter.

Topological modifications in the network can be used to increase the acceptance rate. FIG. 8 illustrates another exemplary embodiment of a network, which is substantially identical to network 100, with the relevant differences noted herein. Network 600 may include one or more scattering nodes 602, which have an input port 12 and an output port 14, as illustrated in FIG. 9. The Enhanced Omega 600 network shown in FIG. 8 mitigates internal contentions by adding scattering stages 610 before the routing stages 620. Scattering stages 610 are formed by the insertion of scattering nodes 602 before the Omega switching nodes 620. The scattering nodes 602 identify messages that will contend for the same output port in the subsequent switching stage and scatter them to different switching nodes. Scattering nodes misroute contending messages rather then drop them, letting the subsequent switching node route them correctly. By adding additional possible routes, the addition of scattering nodes allows more messages to be successfully transmitted, and fewer messages dropped.

Figure 10:
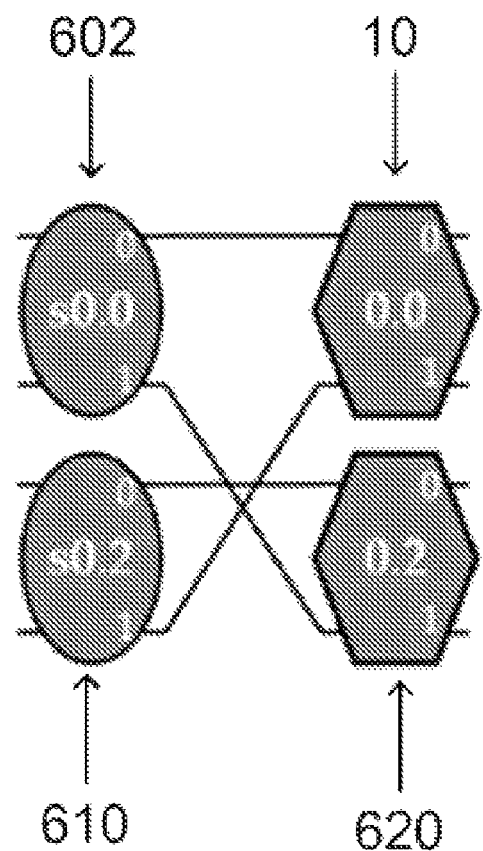

FIG. 10 illustrates how the connection patterns between the scattering stage 610 and the routing stage 620 complete the scattering action while ensuring that even misrouted messages reach their original destinations. Messages are only scattered between switching nodes 10 that lead to the same part of the network in subsequent stages.

The scattering nodes 602 cannot be placed before the last stage of the Omega network 600, because in this stage scattering will cause routing errors. Therefore, a maximum of $N_S-1$ scattering stages can be added to a network of $N_S$ routing stages, increasing its number of stages to $2N_S-1$.

According to another exemplary embodiment, a network of scattering nodes may be inserted before a routing network to serve as a distribution network. A distribution network routes messages to different input ports of a routing network in a manner that minimizes contentions. Additional address bits carry the distribution address, which determines the path taken through the distribution network. The routing network follows the distribution network to ensure correct routing functionality is intact.

The exemplary embodiment may provide several advantages. First, a random route may be chosen in the distribution network by encoding a random distribution address, balancing the load on the routing network regardless of the real traffic pattern. Second, exploiting the physical layer acknowledgement protocol and path diversity, path adjustment may be made by changing the distribution address if the message is dropped in the first attempt. These path adjustments may be made in several iterations within the same timeslot, during the guardband that precedes the payload transmission. Each iteration takes as long as the sum of the roundtrip time across the network and the response time of the acknowledgment generation modules, so the number of iterations may be a design parameter balancing the added utilization gained from multiple iterations and time that can be allocated to path adjustments.

Figure 11:
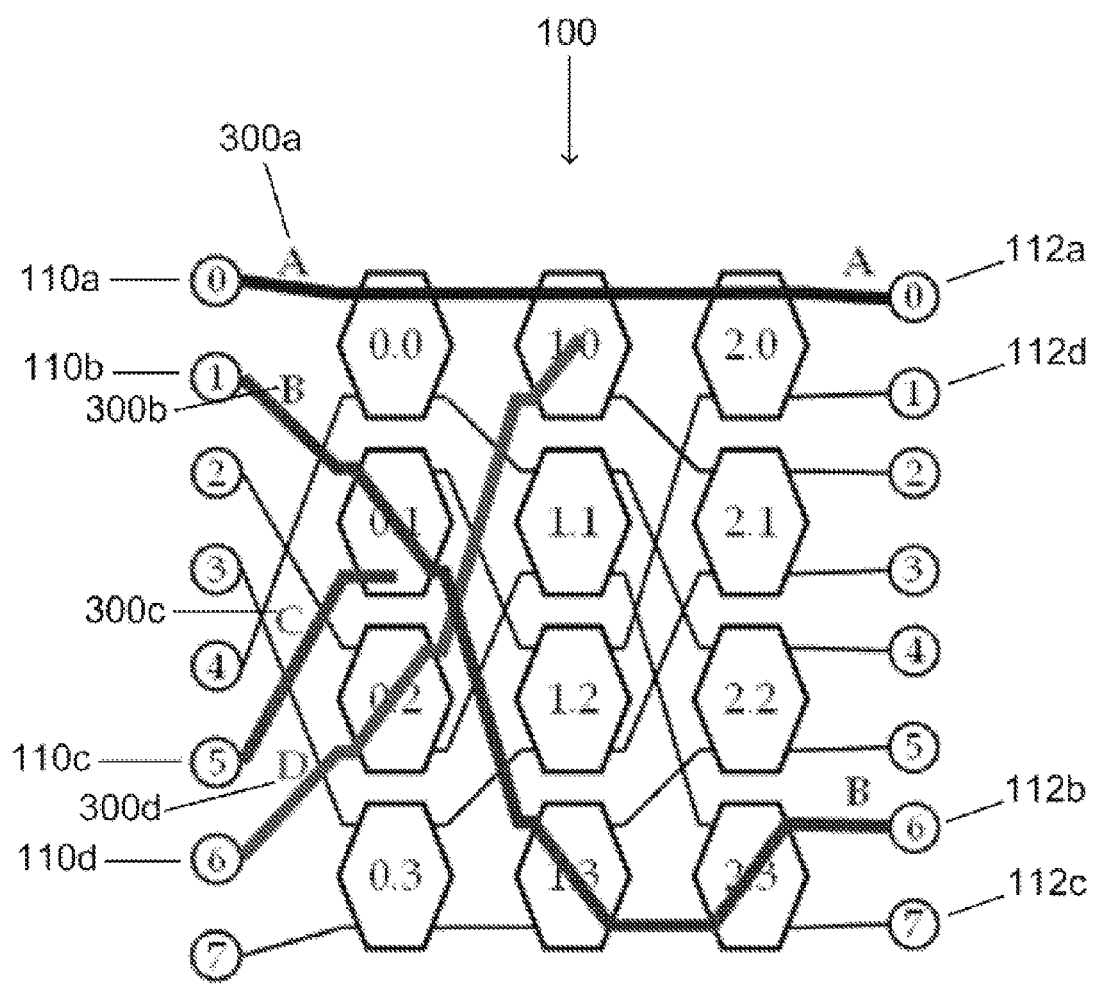
FIG. 11 is a diagram representing a switching network in accordance with an exemplary embodiment of the disclosed subject matter.
Figure 12:
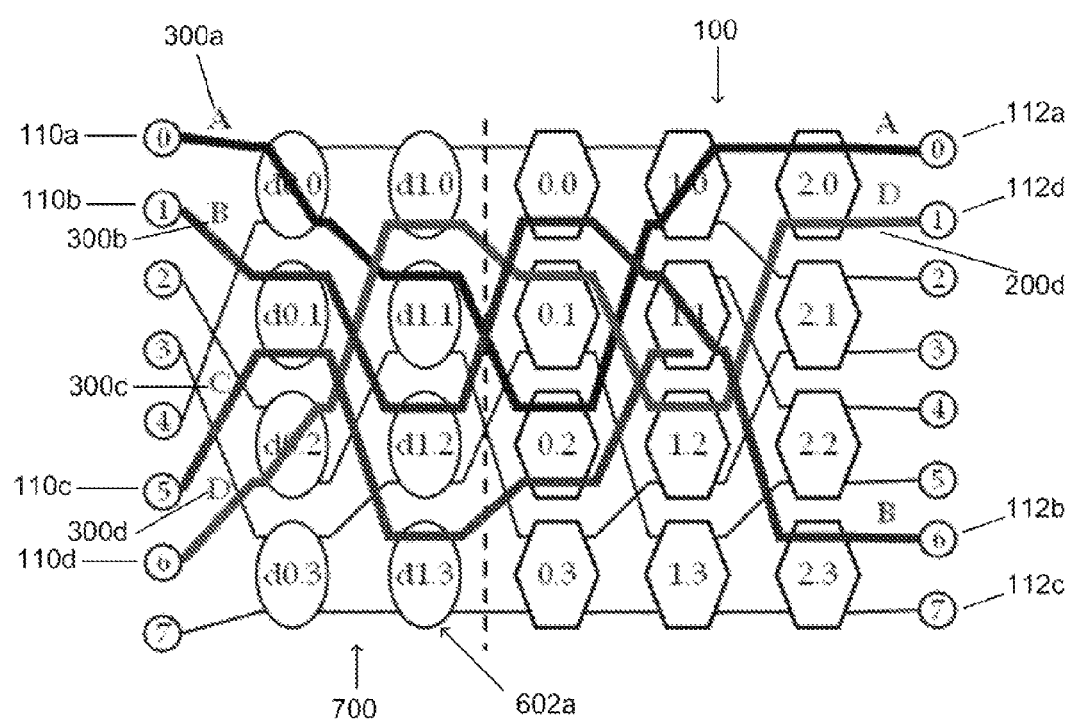
FIG. 12 is a diagram representing a switching network in accordance with an exemplary embodiment of the disclosed subject matter.
Figure 13:
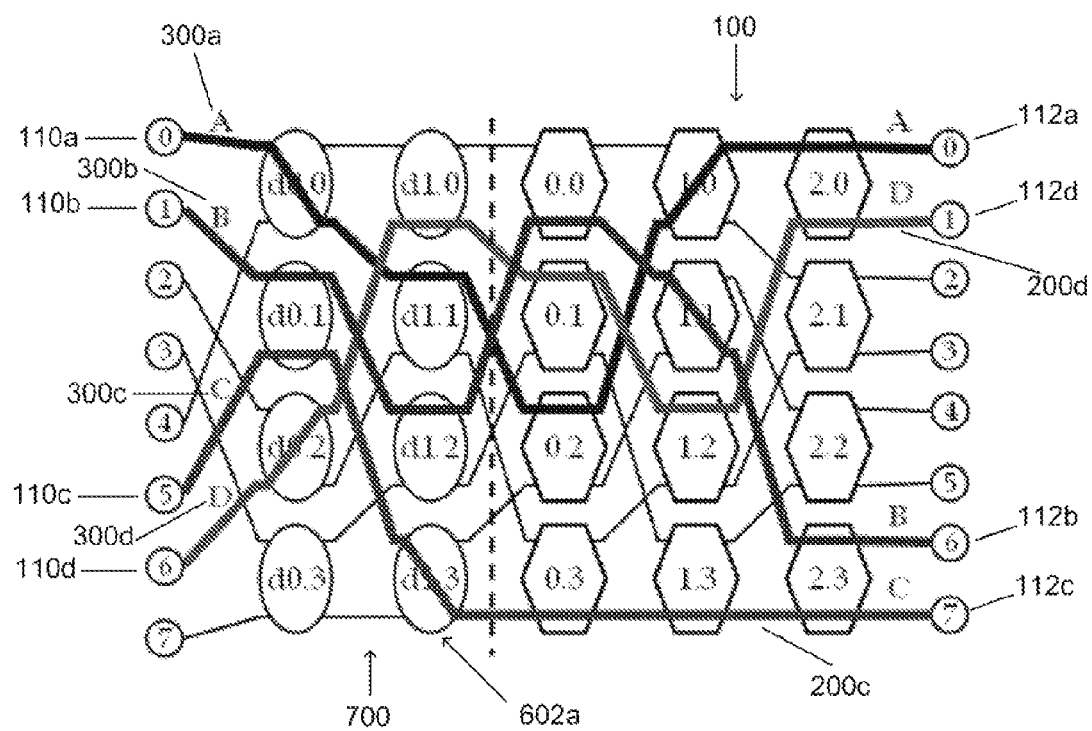
FIG. 13 is a diagram representing a switching network in accordance with an exemplary embodiment of the disclosed subject matter.

FIGS. 11-13 illustrate the advantages of a distribution network in accordance with an exemplary embodiment. In FIGS. 11-13, four messages are transmitted: messages 300a (from source terminal 110a to destination terminal 112a), 300b (110b to 112b), 300c (110c to 112c), and 300d (from 110d to 112d). FIG. 11 illustrates two messages 300c and 300d are dropped due to internal path contentions in an Omega network 100. FIG. 12 illustrates one embodiment of a network that comprises a distribution network 700. By adding a distribution network 700 and routing the messages 300 through it according to a random distribution of addresses, message 300d takes a different path 200d and is transmitted successfully. Message 300c is still dropped, so when the acknowledgment pulse does not arrive on time, source terminal 110c encodes a new distribution address on message 300c. FIG. 13 illustrates how a new distribution address forces message 300c to take a different path 200c at node 602a that resolves the contention. In this manner, the path adjustment technique may use the ultra-low latency of the integrated interconnection network and the distributed computing power of the switching nodes, to increase the network utilization by resolving contentions in the space domain.

The acceptance rate of the path-diversified scalable photonic network has been investigated on a representative 64×64 Omega network with a distribution network. Simulations were run using Bernoulli iid traffic with a varying p parameter (offered load). In the first performance study, the immunity for adversarial traffic patterns was shown by simulating bit-reversal traffic patterns, chosen as adversarial patterns for the Omega network. As expected, adding distribution stages increased the path diversity and performance, but with a diminishing rate.

The effect of the path adjustments was investigated in a network simulated with 0 to 4 path adjustment iterations, under uniform traffic. The performance improvement was substantial, effectively pushing the performance curve closer to the upper boundary represented by a non-blocking network (that would require 4096 switching nodes). The performance improvement beyond two iterations diminished so that two iterations seem to be a good trade-off point, considering the time limitation.

Whereas a non-distribution network switching node may include a gate array as the logic circuit, the node in a distribution network, such as network 700, toggles between several states to avoid interference between messages whose paths are being adjusted and messages that are already successfully routed, i.e., the switching nodes ensure that messages whose transmission has begun will not suffer from interference from messages whose paths are being adjusted. According to an exemplary embodiment, nodes in a distribution network may be implemented as state machines that encode three states for path protection: idle, bar, and cross. When no message is routed through the node, it is in the "idle" path-protection state. When one or more messages is routed through an "idle" node, its path-protection state changes from "idle" to either "cross" or "bar," according to the selected switching state encoded on a message. For example, if interchange switching state 20 is selected, then the node's path-protection state will change to "cross," and if straight switching state 22 is selected, the node's path-protection state will change to "bar." When the node is in the "cross" or "bar" path-protection state (i.e. currently handling a message) and a subsequent message is received (e.g., after has its path has been adjusted), the subsequent message will be passed only if its requested output port matches the current path-protection state (i.e. does not require a state change. If the new message requires a state change, it will be dropped. Once a node is in the "cross" or "bar" path-protection state, it may remain in that state until the message that triggered the state is over. During that time, the node may route messages that are not contending with the original message, while messages that are contending are blocked or dropped. When the slot is over and all messages have been transmitted, the node switches back to the "idle" state and is ready to receive new messages. Error-free transmission of 16×10 Gb/s wavelength-parallel messages has been confirmed for a switching node with three path-protection states.

The average bandwidth routed by a scalable photonic integrated network can be calculated from simulation results. For example, a 64-port Enhanced Omega network, operated at 0.8 offered load, may attain 0.52 acceptance rate. The normalized throughput is therefore 0.8·0.52=0.42. Operation with a 160 Gb/s wavelength-parallel payload (16×10 Gb/s) yields an average throughput of 67 Gb/s per port and 4.26 Tb/s system total average throughput.

The functionality of the switching node and scalable photonic integrated network have been experimentally verified using an optical testbed. Wavelength-parallel messages, consisting of 16 wavelengths modulated at 10 Gb/s, were constructed to create a total payload bandwidth of 160 Gb/s. The payload wavelengths spanned across 29 nm in the C-band, with a minimum spacing of 0.8 nm between adjacent channels, to show that more payload wavelengths could be straightforwardly added to increase the system's bandwidth. The messages were 97.6 ns long, spaced by a 4.8 ns dead time. Once constructed, the messages were multiplexed with the appropriate header wavelengths and injected into the experimental switching node through both input ports. At the node output ports correct routing was verified using an oscilloscope and bit error rate (BER) measurements were conducted on each wavelength individually. Ack pulses (9.6 ns long) were modulated externally on a dedicated wavelength and were injected into the output ports when messages are received. Full routing functionality of all nine possible input combinations (no-packet, packet-to-out0, packet-to-out1 per input port) has been verified in one experiment.

Error-free routing of the messages has been verified and a BER of $10^{-12}$ or better has been confirmed on all 16 payload wavelengths. It has been shown for SOA-based multi-hop networks that after 58 hops, a $10^{-9}$ bit error rate can still be maintained for 8 wavelengths, spanned across a functional bandwidth of 24.2 nm. As even large scalable photonic integrated networks are expected to have a significantly lower number of stages, ($N_S \vee \log_2 N$), a larger functional bandwidth can be attained.

It will be understood that the foregoing is only illustrative of the principles of the disclosed subject matter, and that various modifications can be made by those skilled in the art without departing from the scope and spirit of the disclosed subject matter as defined by the appended claims. Exemplary embodiments may be combined with other exemplary embodiments or modified to create new embodiments.

What is claimed is:

1. An optical network comprising:
   one or more photonic switching nodes each of which comprises a plurality of input ports to receive one or more messages at one or more of the plurality of input ports, each message comprising routing information and data;
   at least one output port; and
   a switch configured to route the one or more messages between the plurality of input ports and the at least one output port and provide bufferless resolution of contention between two or more messages for a common output port upon receipt of at least a portion of the data.

2. The optical network according to claim 1, wherein said switch selects a first message when the two or more messages contend for the common output port.

3. The optical network according to claim 2, wherein said switch selects said first message randomly.

4. The optical network according to claim 2, wherein said switch selects said first message according to an alternating scheme.

5. The optical network according to claim 2, wherein said switch selects said first message according to priority information encoded in said messages.

6. The optical network according to claim 1, wherein said switch drops a second message in the case where when the two or more messages contend for the common output port.

7. The optical network according to claim 1, further comprising a source terminal and a destination terminal, wherein said one or more photonic switching nodes transmit a first message on a path from said source terminal to said destination terminal.

8. The optical network according to claim 7, wherein said destination terminal transmits an acknowledgment signal to the source terminal of a message upon receipt of said message at its requested output port.

9. The optical network according to claim 8, wherein said one or more photonic switching nodes transmit said acknowledgement signal on said path from said destination terminal to said source terminal.

10. The optical network according to claim 8, wherein the network retransmits the message in the case where an acknowledgment signal is not received.

11. The optical network according to claim 10, further comprising a distribution network comprising one or more distribution stages for routing messages comprising a distribution address.

12. The optical network according to claim 11, wherein said source terminal changes the distribution address of a message prior to retransmission.

13. The optical network according to claim 8, wherein the network retransmits the message in the case where an acknowledgment signal is not received prior to the end of a slot.

14. The optical network according to claim 1, wherein said switch comprises a programmable logic device.

15. The optical network according to claim 1, wherein said photonic switching nodes are interconnected in a Banyan topology.

16. The optical network according to claim 1, wherein said photonic switching nodes are interconnected in an Omega topology.

17. The optical network according to claim 1, wherein the routing information is at a first wavelength and the data is at a second wavelength.

18. The optical network according to claim 17, wherein said switch comprises wavelength filters associated with said first wavelength and said second wavelength.

19. The optical network according to claim 1 further comprising one or more scattering nodes.

20. The optical network according to claim 19, wherein one or more photonic switching nodes and one or more scattering nodes transmit said first message on a path from said source terminal to said destination terminal.

21. The optical network according to claim 20, wherein said destination terminal transmits an acknowledgment signal to the source terminal of a message upon receipt of said message at its requested output port.

22. The optical network according to claim 21, wherein one or more photonic switching nodes and one or more scattering nodes pass said acknowledgement signal on said path from said destination terminal to said source terminal.

23. The optical network according to claim 1, wherein transmission is synchronous.

24. The optical network according to claim 1, wherein the network is slotted.

25. A method for transmitting messages through an optical network comprising:
   providing a network comprising one or more photonic switching nodes for transmitting messages therethrough;
   receiving one or more messages at one or more input ports of a photonic switching node, each message comprising routing information and data, the routing information relating to a requested output port;
   in the case of two or more messages contending for a common output port, providing bufferless resolution of contention between messages for the common output port upon receipt of at least a portion of the data; and
   transmitting one or more messages through said network.

26. A method according to claim 25, wherein providing bufferless resolution of contention comprises selecting a first message for transmission to said requested output port.

27. A method according to claim 25, wherein said network comprises a source terminal and a destination terminal, further comprising transmitting an acknowledgment signal upon receipt of the message at the destination terminal.

28. A method according to claim 27, wherein transmitting an acknowledgement signal comprises transmitting said acknowledgement signal on a path from said destination terminal to said source terminal.

29. A method according to claim 28, further comprising retransmitting the message if an acknowledgement signal is not received at the source terminal.

30. A method according to claim 28, wherein the network is slotted, and wherein retransmitting the message comprises retransmitting the message if an acknowledgement signal is not received at the source terminal prior to the end of a slot.

31. A method according to claim 27, further comprising providing a distribution network comprising one or more distribution stages for routing messages comprising a distribution address.

32. A method according to claim 31, further comprising changing the distribution address of a message if an acknowledgement signal is not received at the message's source terminal.

33. A method according to claim 31, further comprising randomly encoding the distribution address of a message.

34. A method according to claim 25, wherein transmitting said first message comprises transmitting said first message on a path through said network.

* * * * *

UNITED STATES PATENT AND TRADEMARK OFFICE
CERTIFICATE OF CORRECTION

| | | |
|---|---|---|
| PATENT NO. | : 8,326,148 B2 | Page 1 of 1 |
| APPLICATION NO. | : 12/113554 | |
| DATED | : December 4, 2012 | |
| INVENTOR(S) | : Keren Bergman et al. | |

It is certified that error appears in the above-identified patent and that said Letters Patent is hereby corrected as shown below:

At column 10, line 25:

"switch drops a second message in the case where when the" should read

-- switch drops a second message when the --

Signed and Sealed this
Twenty-ninth Day of January, 2013

David J. Kappos
*Director of the United States Patent and Trademark Office*